Figure 1:
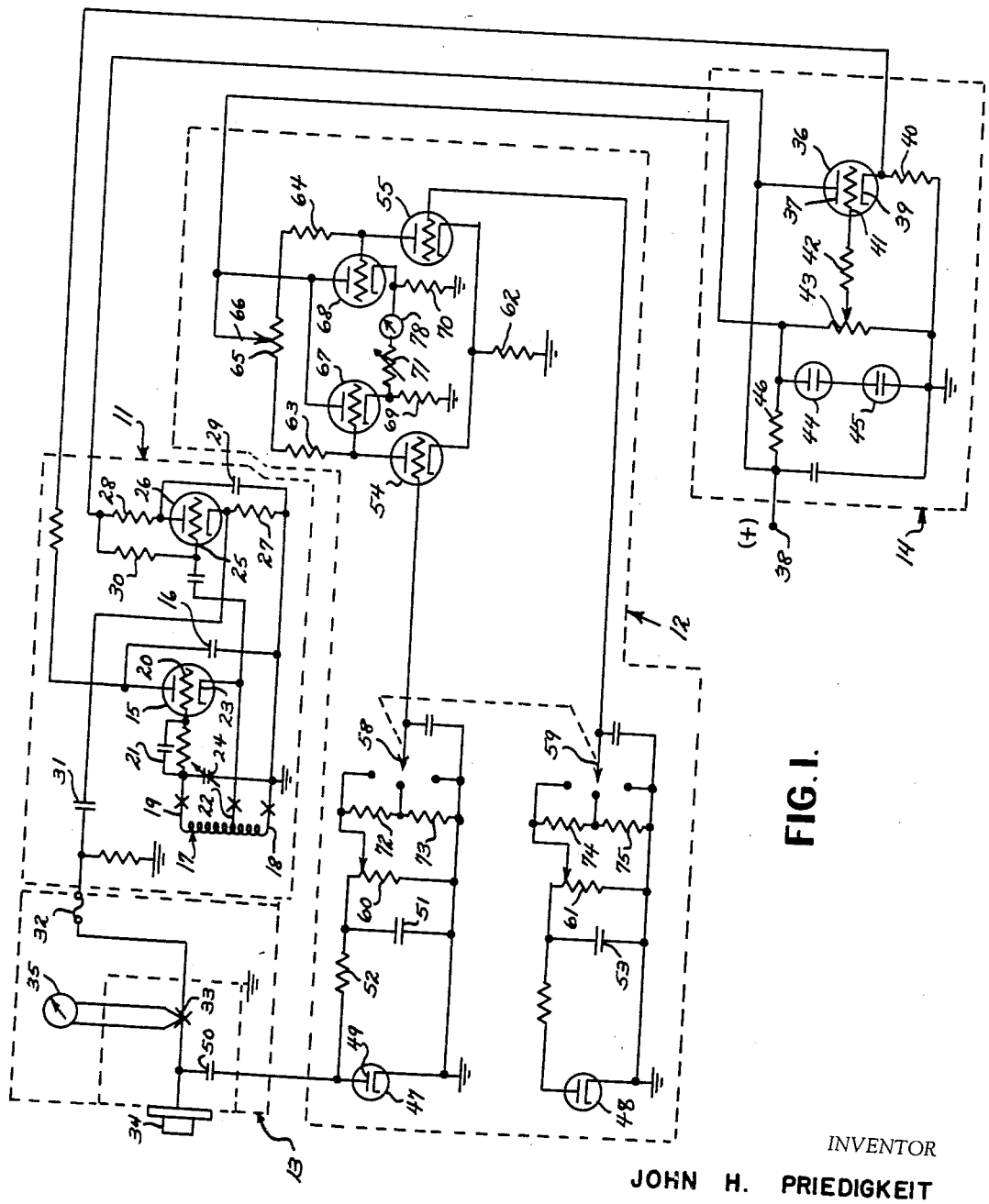

Dec. 20, 1955

J. H. PRIEDIGKEIT 2,728,048

RADIO FREQUENCY IMPEDANCE METER

Filed Sept. 4, 1951

2 Sheets-Sheet 1

INVENTOR
JOHN H. PRIEDIGKEIT

BY
ATTORNEYS

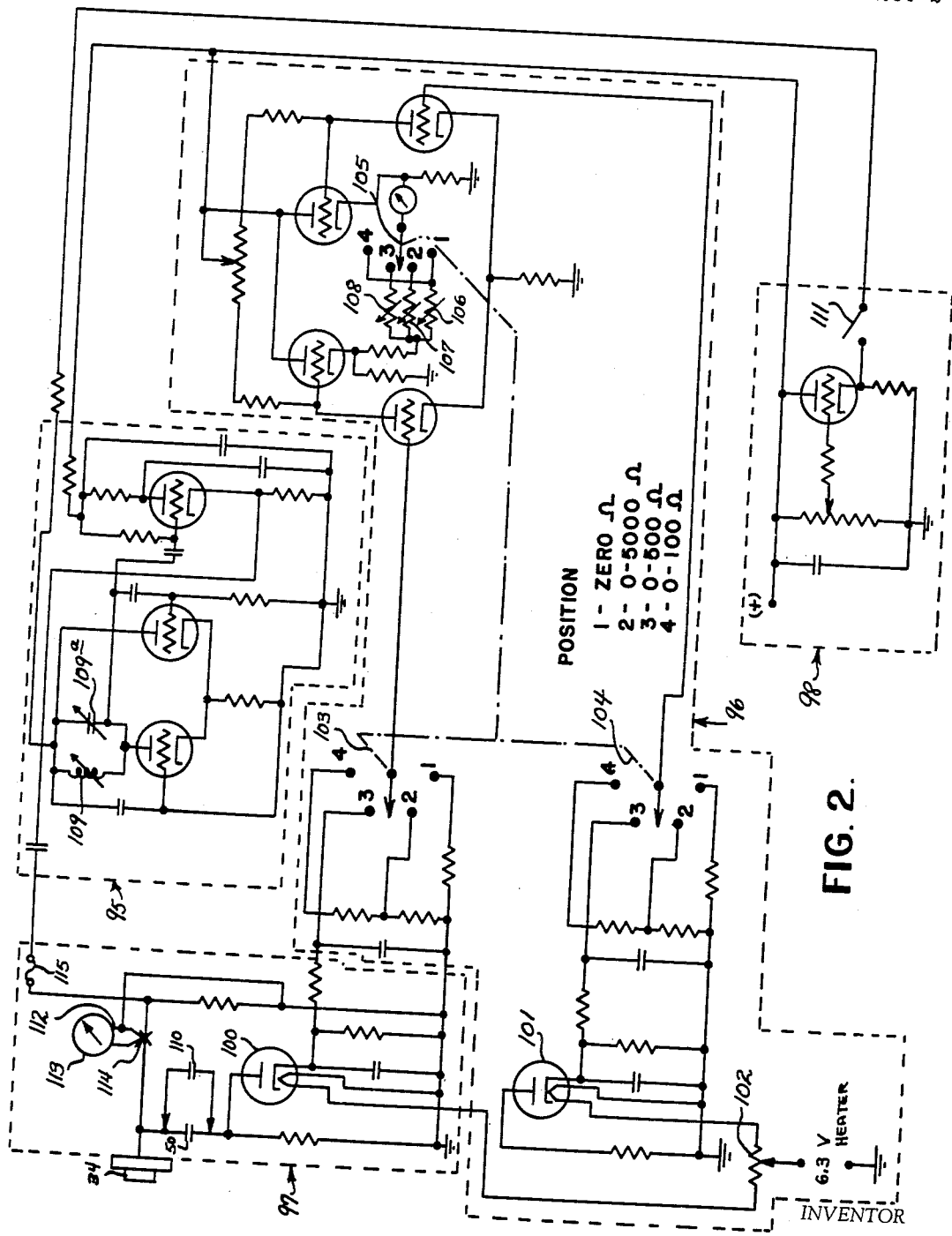

United States Patent Office 2,728,048
Patented Dec. 20, 1955

2,728,048

RADIO FREQUENCY IMPEDANCE METER

John H. Priedigkeit, Berkeley, Calif., assignor to the United States of America as represented by the Secretary of the Navy Application September 4, 1951, Serial No. 244,911

6 Claims. (Cl. 324—57)

This invention relates in general to electrical measuring devices, and in particular to radio frequency impedance measurement devices for antennas and transmission lines.

In many situations it is desirable to make rapid determinations of antenna and transmission line impedances. At present such measurements can be made with a high degree of accuracy with radio frequency bridge apparatus but such measurement with bridge devices is slow and laborious. There are many instances where it is desired to make impedance measurements faster than is ordinarily possible with bridge devices. The apparatus of the present invention is an impedance measuring device intended to fulfill the need for an apparatus capable of providing impedance measurements rapidly and with a good degree of accuracy. This device includes a radio frequency energy source and a voltage measuring device, the overall apparatus operating to impress radio frequency energy of variable frequency across an impedance device and measure the resulting voltage developed across the impedance device. Measurement of this voltage provides an indication of the impedance and a properly calibrated voltmeter suitably isolated from the circuit under test to prevent loading thereby is employed to indicate impedance directly.

Accordingly, it is an object of the present invention to provide an improved radio frequency impedance measurement device.

Another object of the present invention is to provide a device for the rapid determination of the radio frequency behavior of impedance devices.

Another object of the present invention is to provide a device for rapidly determining the impedance of antennas and radio frequency transmission lines.

Another object of the present invention is to provide apparatus for determining the electrical length of coaxial cables.

Another object of the present invention is to provide apparatus for determining the effect on antenna impedance of structures disposed adjacent to the antenna.

With these and other objects in view, as will hereinafter more fully appear, and which will be more particularly pointed out in the appended claims, reference is now made to the following description taken in connection with the accompanying drawings in which:

Fig. 1 is a circuit diagram of a preferred embodiment of the features of the present invention; and Fig. 2 is a circuit diagram of a variant embodiment of the features of the present invention.

Referring now to Fig. 1 of the drawings, there is shown apparatus which is divided into four basic sections, an oscillator section 11, a vacuum tube voltmeter section 12, a completely shielded thermocouple section 13, and an oscillator power control section 14.

The oscillator 11 employs a triode tube 15 connected in a Hartley oscillator circuit with the plate bypassed to ground by means of capacitance 16. The circuit employs a tapped inductance 17 which is shown with one end 18 thereof connected to ground and the opposing end 19 connected to the grid 20 of tube 15 by way of a bias circuit. An intermediate tap 22 of the inductance 17 is directly connected to the cathode 23 of tube 15. Inductance 17 is shunted by a variable capacitance 24 which is adjustable to provide a means of varying the frequency of the oscillator. To facilitate tuning over a wide range, the inductance 17 shown singularly in Fig. 1 actually may comprise several separate inductors, band-switched by means not shown, to provide several frequency bands of operation.

The cathode 23 of tube 15 is connected to the grid 25 of tube 26 which is connected as a cathode-follower amplifier. This cathode-follower circuit includes also cathode load resistor 27, a filter network including resistance 28, capacitance 29 and a grid resistance 30. This cathode-follower circuit is more or less conventional in all respects with one exception, that is, the grid resistance 30 is returned to a positive potential rather than to ground or to a tap point of resistor 27 as would be more conventional. It has been found that in this circuit such a connection improves the linearity of operation and in general reduces harmonic distortion in the output signal as taken from the cathode of tube 26.

The cathode of tube 26 is connected by way of capacitance 31, fuse 32 and thermocouple 33 to the output jack 34. In operation the unknown impedance to be measured is connected between this jack 34 and ground. The purpose of the thermocouple 33 is to measure the current which is produced in the unknown impedance as a result of the radio frequency voltage applied thereto from the cathode-follower tube 26. In a typical application of the principles of this invention the thermocouple sensitivity was such that 3 milliamperes of radio frequency current in the circuit between fuse 32 and jack 34 developed 10 millivolts D.-C. across the heater junction of the thermocouple. With the use of a low resistance D.-C. milliammeter 35 in cooperation with this thermocouple, it was possible to measure the radio frequency currents.

In actual operation of the device it is desirable to maintain the current measured by this thermocouple relatively constant, as for example at 3 milliamperes. Thus, to accommodate impedance devices over a wide range of impedances it is necessary to vary the radio frequency voltage delivered to jack 34 from oscillator 11. Such voltage variation is provided by adjustment of the D.-C. plate potential supplied to the oscillator tube 15. This adjustment is obtained by way of a control tube 36 in the control section 14. Tube 36 is inserted in series in the plate supply lead for tube 15. Tube 36 is connected somewhat as a cathode-follower having its anode 37 directly connected to a source of B+ potential indicated by the numeral 38, the cathode 39 connected to ground through a resistance 40 and the grid 41 connected through a current limiting resistance 42 to potentiometer 43. Potentiometer 43 is connected to a regulated B+ potential obtained from source 38 by way of the regulator tubes 44 and 45 and series resistance 46. With this circuit arrangement the potential of the grid 41 is adjustable and will thereby cause tube 36 to sustain conductivity sufficient to maintain a potential at its cathode which is regulated and held within a few volts of the potential selected by potentiometer 43.

The vacuum tube voltmeter section 12 of the apparatus employs a pair of diode type electron tubes 47 and 48 connected in a rectifying and balancing circuit. Tube 47 has its anode 49 connected to jack 34 through a small coupling capacitance 50, and therefore develops a D.-C. potential dependent on the radio frequency voltage existent at jack 34, this D.-C. potential appearing across capacitance 51 which is connected to anode 49 through a resistance 52. Capacitance 51 and resistance 52 together provide a time constant circuit for filtering the rectified voltage.

A thermionic diode employed in such a rectification circuit has several limitations. It does not operate merely as a unilateral impedance device but also acts somewhat as a low voltage battery due to such effects as emission voltage and contact potential. To permit compensation for this, the balancing tube 48 is connected in a circuit which is identical to that of tube 47 with the exception that the anode thereof does not receive a radio-frequency voltage. The theory behind this is that the D.-C. voltage developed by thermionic action in tube 48 and obtained across capacitance 53 will be equal to that developed in tube 47 and obtained across capacitance 51 so that by subtracting one D.-C. potential from the other, the net effect will be zero.

Such subtraction or combination in opposition is provided in the push-pull two-stage D.-C. amplifier of tubes 54, 55, 67 and 68. Connection of the grid of tube 54 is made to capacitance 51 through a three-position switch 58; and the grid of tube 55 is connected to capacitance 53 through the three position switch 59 which is ganged to switch 58. Switches 58 and 59 provide stepwise selection of the percentage of voltage from capacitances 51 and 53 applied to the grids of tubes 54 and 55 so that several voltage ranges may be accommodated. In one position of switches 58 and 59, the grids of tubes 54 and 55 are grounded to facilitate balancing the D.-C. amplifier system. In a typical embodiment the mid-position of switches 58 and 59 provides for a fifteen-volt measurement whereas the upper position (full voltage) provides for a four and one half volt measurement.

Additionally interposed in the signal paths between the grids of tubes 54 and 55 and the capacitances 51 and 53 are balancing potentiometers 60 and 61 which provide a means of adjusting for unbalance between the tubes 47 and 48.

In the D.-C. amplifier, tubes 54 and 55 have their cathodes mutually connected to ground through resistance 62. This assists in the introduction of the compensating signal from tube 48 because biasing voltage developed across resistance 62 will cause conductivity to change inversely in tubes 54 and 55 responsive to a change at the grid of either tube.

Tubes 54 and 55 forming a push-pull voltage amplifier have anode load resistances 63 and 64 which are connected to opposing ends of potentiometer 65, the center tap 66 thereof leading to a source of regulated (B+). Potentiometer 65 provides a further means of balancing the D.-C. amplifier.

The anodes of tubes 54 and 55 are directly connected to the grids of cathode-follower tubes 67 and 68 which have separate cathode resistors 69, 70. Thus by well known cathode-follower action, cathode voltages, obtained at low impedance, are always quite close to the voltages of the anodes of the tubes 54 and 55. The cathodes of tubes 67 and 68 are connected together through a series path including resistance 71 and milliammeter 78 to prevent damage to the meter. This series path will be non-conductive whenever the cathodes of tubes 67 and 68 are at similar potentials; however, conduction therethrough will take place whenever a potential difference exists between the cathodes. Resistance 71 must be adjusted in operation to limit the maximum current flow through meter 78.

In adjustment of the circuit balancing the voltmeter is the first step. With the switches 58 and 59 in their lowest position so that the grids of tubes 54 and 55 are grounded, potentiometer 65 is adjusted to where there is no current flow indicated by meter 78. With the oscillator tube 15 inoperative, rendered so by moving the tap of potentiometer 43 to the ground end thereof and also preferably with jack 34 grounded to assure that no radio frequency voltage is applied to diode 47, the switches 58—59 are moved to their top position, connecting the grids of tubes 54 and 55 direct to the taps of potentiometers 60 and 61. In this arrangement the potentiometers 60 and 61 are then adjusted to where the meter 78 also indicates zero current flow. This adjustment is preferably completed with the tap on one of the potentiometers at the upper end of the potentiometer so that the grid of one of the tubes 54 or 55 is in effect connected directly across the corresponding capacitance 51 or 53. In practice it will be found that it is as likely to be one potentiometer as the other depending upon which of the diodes 47 or 48 develops the higher contact potential. Normally there will be very little difference so that for all practical purposes the grids of both tubes 54 and 55 will be directly placed across capacitances 51 and 53.

With the vacuum tube voltmeter 12 thus balanced it may be desirable to check and set the thermocouple 33 and its meter 35. To do this an external battery in series with a D.-C. milliammeter may be connected between jack 34 and ground. The meter 35 may then be adjusted so that its reading corresponds to the reading of the external D.-C. milliammeter.

The full scale indication of the meter 78 may next be set for which operation it is desirable that the oscillator 15 be operative with a vacuum tube voltmeter or bridge of known accuracy connected to jack 34. Typically then and with switches 58 in the middle position, the oscillator control potentiometer 43 is adjusted to where the external voltmeter connected to jack 34 indicates 15 volts. When this occurs the meter series resistance 71 is adjusted to where full scale deflection of meter 78 is obtained.

Frequency calibration of the oscillator variable condenser 24 may be made with a heterodyne frequency meter connected to jack 34. Inductance 17, although shown singly in Fig. 1 to avoid undue circuit complexity, normally would be band switched to cover a wide range such as 2–20 megacycles.

The voltmeter 78 itself is a simple, rugged, 1 milliampere full scale milliammeter. The scale thereof is calibrated directly in ohms impedance to make it direct reading. In the typical instrument thus far described, a full scale meter reading of 4.5 R. M. S. volts is obtained for the range with switches 58 and 59 in the topmost position, and a full scale reading of 15 volts is to be obtained with the switches 58 and 59 in the mid-position. Note that this requirement sets the ratio of the resistors 72, 73, 74 and 75. Resistor 73 is equal to four and one-half fifteenths of the sum of resistors 72 and 73. Likewise a similar ratio prevails for resistors 74 and 75. The scale of meter 78 is first temporarily calibrated in R. M. S. volts for the two ranges of 4.5 and 15 volts R. M. S., then permanently calibrated in ohms impedance by the simple expedient of dividing the R. M. S. volts numerals by a factor of $3 \times 10^{-3}$, the standard measuring current, thereby giving scales of 1500 ohms impedance.

In operation of the apparatus thus far described, the unknown impedance is connected to the jack 34 and the oscillator plate voltage is adjusted by means of potentiometer 43 to obtain a radio frequency current of 3 milliamperes in the unknown impedance as indicated on meter 35. With such adjustment the calibrated meter 78 directly indicates load impedance at the frequency of the oscillator. The oscillator frequency may then be varied manually and readings of meter 78 made to obtain impedance maxima and minima if the load is of a resonant nature such as an antenna or a mismatched transmission line.

In the case of a transmission line this instrument may also be used to determine attenuation per unit length of cable employing the relation.

$$\alpha = \frac{Z_0 \times 8.7}{Z_{max} \times L}$$

where

α = attenuation per hundred feet
$Z_0$ = characteristic impedance of the cable
$Z_{max}$ = maximum impedance at any resonant frequency
L = length of cable in hundreds of feet To determine the electrical length of a cable it is merely necessary to note the frequency of two successive energy maxima, either with the cable terminated in an open circuit or in a closed circuit then, $$L' = \frac{300}{2\Delta F}$$

where $L'$ = electrical length in meters
$\Delta F$ = difference in frequency between two impedance maxima Knowing thus the electrical length of the cable, the physical length may be calculated from the relationship $$L = \frac{vL'}{c}$$

where

L = physical length of cable in meters
$L'$ = electrical length of the cable in meters
v = velocity of propagation in the cable
c = velocity of propagation in free space.

This same relationship may be used to determine the propagation constant for the cable if that is unknown and the physical length can be measured.

A variant embodiment of the features of the present invention is shown in Fig. 2 to which reference is now made. It will be seen that the apparatus of Fig. 2 is quite similar to that of Fig. 1; however, it does possess certain refinements. The apparatus of Fig. 2 comprises an oscillator section 95, a vacuum tube voltmeter section 96, a thermocouple section 97, and an oscillator power control section 98, generally similar to the corresponding parts of Fig. 1 but arranged for a greater number of indication ranges.

The rectifier tubes 100 and 101 of the voltmeter section 96 of Fig. 2 are shown with a heater balancing arrangement including potentiometer 102 so that the relative heater temperatures may be controlled to balance diode emission voltage or contact potential. Such an arrangement is to be contrasted with the dual potentiometers 60 and 61 employed in the apparatus of Fig. 1 for the same purpose. For this reason two separate diode tubes are shown whereas in Fig. 1 both diodes 47 and 48 could be in a single envelope with common heater connections. In Fig. 2 diodes 100 and 101 are shown in different sections of the apparatus, tube 100 in the thermocouple section 97 and tube 101 in the voltmeter section 96 to reduce the danger that radio-frequency signals will reach the balancing tube 101 and associated circuits. Additionally switches 103 and 104 are of the four position variety and are ganged to a third four position switch 105 in the meter part of the voltmeter section 96. Four positions on these switches provide for three impedance ranges in addition to the zero adjust position. Typical ranges selected are 0–100 ohms, 0–500 ohms and 0–5000 ohms. Switch 105 is included to permit individual setting of the full scale meter series resistance for each usable range, rather than requiring a compromise setting as required in the apparatus of Fig. 1. Three series variable resistors 106, 107 and 108 are selectable one at a time by switch 105. It can be noted that only three series resistors are required because in the "Zero Adjust" position it is the balance which is set at which time the instrument is adjusted for zero current flow, whereas the series resistors used in the three operating positions set the maximum current through the meter for each range.

In the oscillator section 95, a two-terminal oscillator circuit is employed rather than the Hartley oscillator of the first embodiment. This type oscillator is well known in the art and is particularly desirable because it does not require a tapped condenser or tapped inductance but uses an amplifier tube for feedback. In this circuit the inductance 109 and the capacitance 109-a are ganged together for simultaneous adjustment thereof eliminating the need for a band switch and permitting continuous tuning. This type of oscillator is more stable than the Hartley circuit when subjected to variable plate voltages as is here necessary to permit amplitude adjustment.

The circuit of Fig. 2 has another important difference from the circuit of Fig. 1. Stray capacitances must be kept very low in this instrument because any capacitance of the jack 34 to ground is effectively placed in shunt with the unknown impedance. With care in parts layout and wiring this shunt capacitance can be held to 2.5 micro micro-farads or less but even this is noticeable at high impedances. The rectifier coupling capacitance 50 is consequently made very small and provides very loose coupling. At low impedances, a larger coupling capacitance is not objectionable, in fact, it is actually desirable. Accordingly, to provide the low range (0–100 ohms), a capacitance 110 typically of .001 microfarads is manually placed in shunt with capacitance 50 and as a result of the increased coupling thereby provided, increases the sensitivity of the instrument. This capacitance could be band-switched however it is not desirable that such an arrangement be employed because of the added capacitance introduced thereby.

In the apparatus of Fig. 2 one lead 112 to the thermocouple meter 113 for thermocouple 114 is shown grounded. This type of connection has the advantage that the meter movement may be grounded to minimize capacitance variation due to movable objects in proximity to the meter but it imposes the requirement that the thermocouple leads be electrically insulated from the circuit leads connecting jack 34 and fuse 115.

The remaining change of significance is the inclusion of a switch 111 in the plate voltage lead to the oscillator in block 95 so that the oscillator may be rendered inoperative during the zero adjustment of the instrument.

The invention thus described provides apparatus whereby impedance measurements may be made with ease and a rapidity heretofore impossible.

From the foregoing description of the present invention it is apparent that many modifications may be made therein without exceeding the scope thereof as defined by the appended claims.

What is claimed is:

1. Apparatus for determining the impedance of an impedance device comprising, adjustable generator means for producing radio frequency current of a selectable frequency, coupling means for applying the radio frequency current to the impedance device, said generator means comprising an oscillator circuit, first and second vacuum tubes in said circuit, means connecting said first tube to a power supply and to said second tube, said second tube being connected in said circuit as a cathode-follower amplifier, a grid resistance for said second tube, and means returning said grid resistance to a positive potential so as to reduce harmonic distortion in the out-put signal of said second tube, current measuring means for measuring the current produced in the impedance device, control means for adjusting the amplitude of current in the impedance device to maintain a selected flow therein, high impedance voltmeter means connected across the impedance device for providing a meter deflection dependent upon the voltage developed across the impedance device with selected current flow therein, and a calibration scale for said voltmeter means cooperative with meter deflection therein to indicate impedance corresponding thereto at a selected frequency.

2. Apparatus for determining the impedance of an impedance device comprising, generator means for producing radio frequency current, coupling means for applying the radio frequency current to said impedance device, said generator means comprising an oscillator, an isolating amplifier, and means for varying the frequency of said oscillator, thermocouple means serially connected with said impedance device for measuring the current flow therethrough, voltage control means connected to said generator means controlling the flow of current through said impedance device and voltmeter means connected in parallel with said impedance device for providing a meter deflection dependent upon the voltage developed across said impedance device with a predetermined current flow therein, and a calibration scale for said voltmeter means co-operative with meter deflection therein to indicate impedance corresponding thereto.

3. Apparatus for determining the impedance of an impedance device comprising, generator means for producing radio frequency current, coupling means for applying the radio frequency current to said impedance device, said generator means comprising an oscillator, means for varying the frequency of said oscillator, a voltmeter connected across said impedance device for measuring the impedance thereof, said voltmeter comprising a pair of thermionic rectifying devices, a pair of amplifiers, balancing means interconnecting one of said rectifying devices with one of said amplifiers for balancing said voltmeter, and switch means associated with said amplifiers for accommodating a plurality of voltage ranges for said voltmeter.

4. The combination according to claim 3 wherein thermocouple means are connected between said oscillator and impedance device for measuring current flow through said device, and control means for adjusting the amplitude of current in said impedance device to maintain a selected flow therein.

5. The combination according to claim 3 wherein voltage control means are connected to said oscillator for controlling the voltage output of said oscillator.

6. The combination according to claim 5 wherein said voltage control means comprises a vacuum tube, and a potentiometer connected to the grid of said vacuum tube for controlling the supply of voltage to said oscillator.

References Cited in the file of this patent

UNITED STATES PATENTS

| | | |
|---|---|---|
| 1,917,417 | Zuschlag | July 11, 1933 |
| 2,324,215 | Kinsburg | July 13, 1943 |
| 2,337,759 | Loughlin | Dec. 28, 1943 |
| 2,406,405 | Salisbury | Aug. 27, 1946 |
| 2,535,608 | Smith | Dec. 26, 1950 |
| 2,588,702 | Cornelius | Mar. 11, 1952 |
| 2,593,175 | Packard et al. | Apr. 15, 1952 |